United States Patent [19]

Peden et al.

[11] Patent Number: 4,782,692
[45] Date of Patent: Nov. 8, 1988

[54] ENGINE CRANKSHAFT POSITION SENSOR

[75] Inventors: Richard A. Peden, Livonia; Ronald Paul, Detroit, both of Mich.

[73] Assignee: General Motors Corporation, Detroit, Mich.

[21] Appl. No.: 95,867

[22] Filed: Sep. 14, 1987

[51] Int. Cl.⁴ .................................... G01M 15/00
[52] U.S. Cl. .................................... 73/117.3
[58] Field of Search ............... 73/117.3, 116, 118.1

[56] References Cited

U.S. PATENT DOCUMENTS 4,472,779 9/1984 Marino et al. ............. 73/117.3 X

Primary Examiner—Jerry W. Myracle
Attorney, Agent, or Firm—Howard N. Conkey

[57] ABSTRACT

A simulator for generating simulated crankshaft angle signals during rotation of an internal combustion engine for use as a backup to a sensor sensing the ring gear teeth is described. A number representing the time in terms of the pulses from a clock for the engine crankshaft to rotate through an angle equal to one-half the angular spacing of the teeth on the ring gear is determined based on the current engine speed. This number is continuously counted by a counter whose output comprises simulated crankshaft angle signals.

1 Claim, 2 Drawing Sheets

ENGINE CRANKSHAFT POSITION SENSOR

This invention relates to an engine crankshaft angle sensor and more particularly to a system for providing simulated crankshaft angle signals during rotation of the engine such as during the failure of the crankshaft angle sensor.

BACKGROUND OF THE INVENTION

It is common for engine controllers to provide control based on engine crankshaft angular position. For example, in combustion timing control, the timing involves either the crankshaft angle location of spark for gas fueled engines or the crankshaft angle of fuel injection for diesel fueled engines. In each of these engines, the crankshaft timing angles are generally referenced to the engine piston top dead center positions.

Two sensors are typically used to establish the desired crankshaft angles. One sensor provides crankshaft position signals at the piston top dead center positions of each cylinder. In a diesel engine, this sensor may take the form of a one-tooth per cylinder gear and a tooth sensor mounted in the engine driven solenoid pump. This sensor provides an indication of the location of the top dead center position for each cylinder and is the basis for engine timing. Signal resolution for an 8-cylinder engine is one pulse per 90 degrees.

The second sensor generates angle signals at small increments of engine crankshaft rotation. Typically, these angle pulses are obtained by monitoring the passing of the teeth on the engine ring gear by an electromagnetic pickup. These teeth are spaced at two to three degree intervals around the ring gear so that an electrical pulse is provided for each two to three degrees of angular rotation of the engine. These crankshaft angle signals in conjunction with the crankshaft position signal provided at each piston top dead center position of the engine enable the location of desired crankshaft angles for fuel control and combustion timing.

In the foregoing systems, if there is a failure in the sensor providing the crankshaft angle signals, the system would be incapable of providing accurate control of fuel or combustion timing to the engine. For example, if one of the teeth spaced around the flywheel for providing the crankshaft angle signals should wear or break off resulting in a loss of the corresponding crankshaft angle signal, a deterioration in the control of fuel and combustion timing would result.

SUMMARY OF THE INVENTION

The subject invention provides for a simulator for generating simulated crankshaft angle signals during engine rotation. The simulator may function as a backup source for crankshaft angle signals in the event of the failure of the primary crankshaft angle sensor or may be the primary source of crankshaft angle signals for fuel and combustion timing control.

In general, the subject invention provides for the simulated crankshaft angle signals by calculating the engine speed based on the elapsed time between two consecutive piston top dead center positions of the crankshaft as sensed by a top dead position sensor mounted in the engine driven solenoid fuel pump as described above. Based on the calculated engine speed, the program then obtains from a lookup table or by a mathematical expression a number whose value represents the increment of time required for the crankshaft to rotate through a predetermined crankshaft angle. In the preferred embodiment, the increment of time is the time for the crankshaft to rotate through one-half of the desired period of the crankshaft angle signals. When the simulated angle signals are used as a backup to a crankshaft angle signal generator, the number in the preferred embodiment represents the increment of time required for the crankshaft to rotate through one-half of the angular spacing of the teeth on the flywheel ring gear. For example, if the angular spacing of the teeth on the flywheel ring gear is 2.6 degrees, the number retrieved from memory or determined from a mathematical expression may represent the time for the crankshaft to rotate through 1.3 degrees of crankshaft rotation at the calculated engine speed.

In one embodiment the time value retrieved from memory is based on the frequency of a clock signal. The time value is loaded into a counter operating in a continuous counting mode clocked by the clock signal. This results in the output of the counter having a period equal to the desired crankshaft angle signal and (when used as a backup signal to a crankshaft angle signal generator) equal to the spacing of the teeth on the ring gear of a crankshaft angle signal generator.

When used as a backup to a crankshaft angle sensor, the simulator monitors the performance of the sensor and if no failure is sensed, the signals based on the sensing of the flywheel ring gear teeth are utilized in engine control. However, if a failure is sensed, the simulated crankshaft angular signals are then substituted to provide an uninterrupted crankshaft angle signal for engine control.

DESCRIPTION OF THE PREFERRED EMBODIMENT

Figure 1:
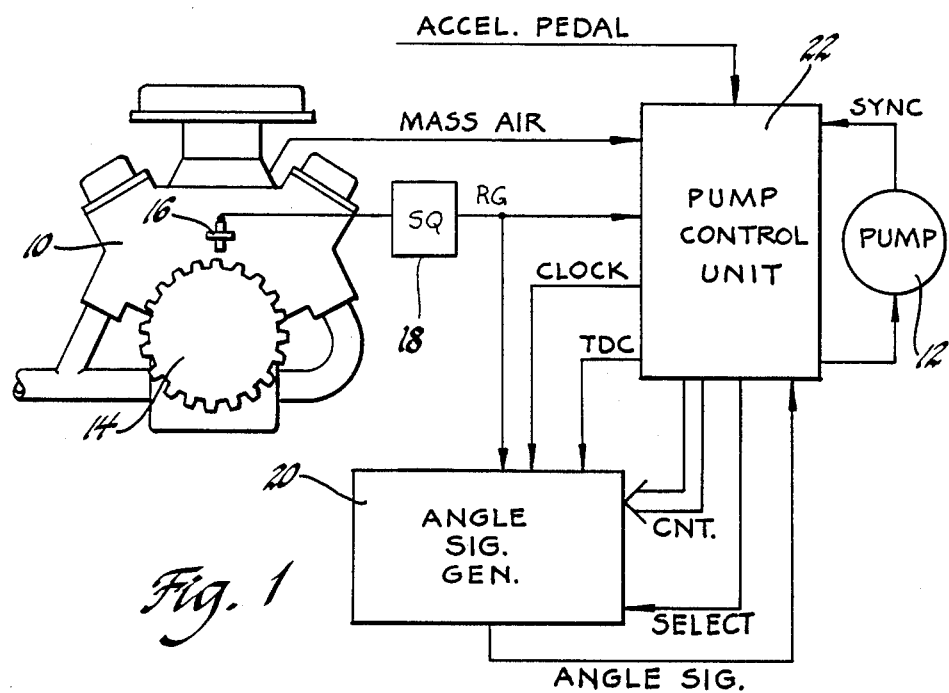
FIG. 1 illustrates an engine and a control system therefor that includes the system for generating the simulated crankshaft angle signals in accord with the principles of this invention.

The preferred embodiment of this invention is described with respect to an 8-cylinder diesel engine 10 that rotates a fuel pump 12 for injecting fuel to the individual cylinders. The fuel pump 12 is a known form of pump that includes a solenoid energized in timed relationship to the engine position so as to control the timing and quantity of fuel injected into the individual cylinders. The engine 10 includes a flywheel starter ring gear 14 connected to the engine crankshaft having teeth spaced around its periphery at, for example, 2.6 degree intervals. An electromagnetic sensor 16 is positioned to sense the teeth on the flywheel 14 as it is rotated by the engine crankshaft. The output of the sensor 16 is provided to a squaring amplifier 18 whose output comprises ring gear crankshaft angle pulses RG that are supplied to a crankshaft angle signal generator 20 and to a pump control unit 22.

Control of the pump 12 to deliver fuel to the engine 10 is provided by the pump control unit 22. In addition to the RG pulses, the pump control unit 22 receives inputs from a mass air flow sensor representing the mass air flow into the engine 10 and from an accelerator position sensor representing the position of a conventional operator adjusted accelerator pedal. The pump control unit 22 also receives a sync pulse at an angular position before top dead center of each of the engine pistons. Alternatively, the sync signal may be provided at the top dead center position of each of the engine pistons.

The sync pulses are provided by a pulse generator within the pump 12. This generator may take the form of teeth rotated in proximity to an electromagnetic sensor so as to generate a pulse output associated with each top dead center position of the pistons of the engine 10.

The pump control unit 22 also receives crankshaft angle signals from the crankshaft angle generator 20 that is comprised of either the ring gear crankshaft angle signals RG provided by the squaring circuit 18 or simulated crankshaft angle signals SIM generated by the circuit 20 in accord with the principles of this invention. The crankshaft angle signals from the generator 20 are provided to the pump control unit 22 at each 2.6 degrees of crankshaft rotation.

The pump control unit 22 may take the form of the system illustrated in the U.S. Pat. No. 4,653,315 issued Mar. 31, 1987 and assigned to the assignee of this invention. In general, the pump control unit 22 responds to the various signal inputs thereto to determine the precise location of the top dead center position of each of the pistons of the engine 10 and controls the input to the pump 12 so as to provide fuel injection timed precisely to the engine top dead center position. The accuracy of that and other fuel control systems is dependent upon the provision of the crankshaft angle signals at the precise angular intervals.

The pump control unit 22 such as illustrated in the above-mentioned patent includes a digital computer of standard configuration that includes a central processing unit, a random access memory, a read only memory, a nonvolatile memory, input/output circuits, an analog-to-digital converter and a clock. The operation of the pump control unit 22 is provided by means of a program permanently stored in the read only memory and which is repeatedly executed for controlling the fuel delivered by the pump 12.

To assure that the crankshaft angle signals are accurately provided to the pump control unit 22, even though a failure may occur in the generation and provision of the ring gear crankshaft angle signals RG, the pump control unit 22 monitors the number of ring gear crankshaft angle signals RG provided by the squaring circuit 18 between consecutive top dead center positions of the engine 10. If the number of RG signals counted between consecutive top dead center positions of the engine 10 indicate a failure in the generation of the RG signals, the pump control unit 22 provides for a substitution of the simulated crankshaft angle signals SIM via the crankshaft angle signal generator 20 so as to supply an uninterrupted crankshaft angle signal to the pump control unit 22.

Figure 2:
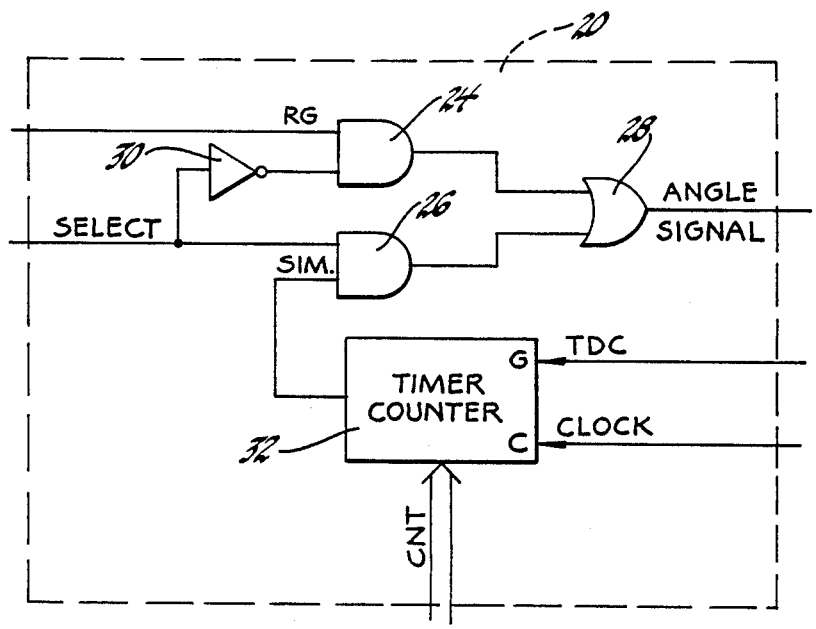
FIG. 2 is a schematic diagram of the crankshaft angle signal generator that selects between the crankshaft angle signals based on the sensing of the flywheel ring gear teeth or the simulated crankshaft angle signals.

Referring to FIGS. 1 and 2, the crankshaft angle signal generator 20 will be described as controlled by the pump control unit 22. In general, the generator 20 includes a pair of AND gates 24 and 26 that are selectively enabled or disabled to transmit either the ring gear crankshaft angle signals RG provided by the squaring circuit 18 or simulated crankshaft angle signals SIM to an OR gate 28. Specifically, a select signal from the pump control unit 22 is provided to an inverter 30 whose output is coupled to an input of the AND gate 24. When the select signal is low, the output of the inverter 30 enables the AND gate to pass the ring gear crankshaft angle signals RG applied to a second input of the AND gate 24 to an input of the OR gate 28. The select signal from the pump control unit 22 is directly coupled to one input of the AND gate 26 which is enabled when the select input is in a high state to transmit simulated crankshaft angle signals SIM provided by a timer counter 32 to a second input of the OR gate 28. In operation, the select signal enables either the AND gate 24 or the AND gate 26 to pass one of the crankshaft angle signals to the OR gate 28 whose output comprises the crankshaft angle signals utilized by the control unit 22 in controlling the injection pump 12.

As previously indicated, the simulated crankshaft angle pulses SIM are provided by the counter 32 which is clocked by the output of the clock in the digital computer of pump control unit 22. The duration timed by the counter 32 is established by a number preset therein by the pump control unit 22 and the frequency of the clock signal. The counter 32 is set in a continuous mode wherein the number preset therein is repeatedly counted so that its output changes states each time the number is counted. The output of the counter 32 is a squarewave signal that comprises the simulated crankshaft angle signal SIM provided to the AND gate 26. The period of the simulated crankshaft angle signals SIM is established by the count set into the counter 32 and the frequency of the clock signal. If the speed of the engine 10 is known, a count may be determined and set into the counter 32 that represents the time that it takes for the ring gear 14 of the engine 10 to rotate through one-half of the angle defined by the spacing between consecutive ring gear teeth at the current engine speed so that the period of the pulses from the timer 32 are representative of crankshaft angle signals provided at intervals substantially equal to the spacing of the teeth on the ring gear 14.

The pump control unit 22 provides a top dead center signal to a gate input of the counter 32 which functions to load a count specified by the pump control unit 22 into the counter 32 with each top dead center position of the engine 10.

Figure 3:
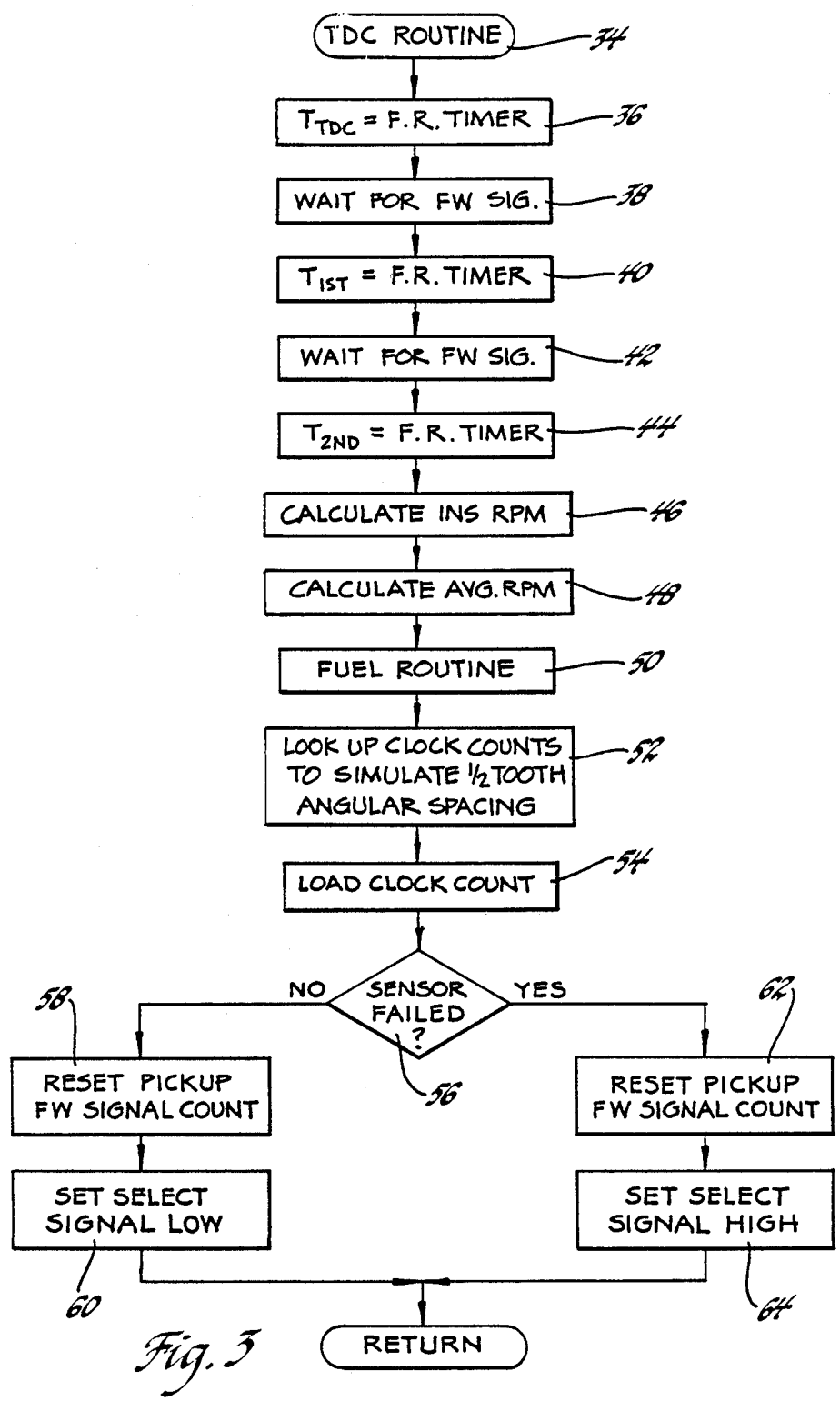
FIG. 3 is a flow diagram illustrating the operation of the pump control unit of FIG. 1.

Referring to FIG. 3, there is illustrated a top dead center routine that is executed by the digital computer of the pump control unit 22 upon the occurrence of each piston top dead center position of the crankshaft of the engine 10. For example, this routine may be executed by the occurrence of an interrupt upon the sensing of a top dead center position.

The top dead center routine is entered at point 34 and proceeds to a step 36 where the last value of a time $t_{TDC}$ representing the time of occurrence of the prior top dead center position stored during the prior execution of the step 36 is saved. Also at step 36 a new value of $t_{TDC}$ representing the time of occurrence of the last top dead center position is stored. The time of occurrence of the last top dead center position is obtained by sampling the count in a free running counter in the digital computer of the pump control unit 22 that is clocked by the computer clock signal.

At the next step 38, the program waits until an angle signal is provided by the angle signal generator 20. When this angle signal is sensed, the program then proceeds to a step 40 where the count in the free running counter is stored in the memory representing the time $t_{1st}$.

At step 42, the program waits for the next angle signal from the angle signal generator 20. When sensed, a stored time $t_{2nd}$ is set at step 44 equal to the count in the free running timer. The difference in the stored values of $t_{1st}$ and $t_{2nd}$ stored at steps 40 and 44 represents the time interval between consecutive crankshaft angle signals provided by the generator 20 and therefore the time for the engine crankshaft to rotate through a known angle (2.8 degrees in this embodiment).

At step 46, the instantaneous speed of rotation of the engine 10 is calculated based on the time for the engine to rotate through an angle equal to the spacing of the teeth in the ring gear 14 as represented by the difference in the values of $t_{1st}$ and $t_{2nd}$ stored at steps 40 and 44.

At the next step 48, the program determines the average engine speed based on the time for the engine to rotate between consecutive top dead center positions. This average speed is calculated based on the angle between consecutive top dead center positions (such as 90 degrees in an 8-cylinder engine) and the difference between the times of occurrence of the last two top dead center positions stored at step 36. As will be described, this average engine speed is utilized to determine the count to be set into the counter 32 of the angle signal generator 20 so as to establish a period of the simulated crankshaft angle signal output of the counter 32.

At step 50, the program determines the injection timing and the quantity of fuel required for the particular engine operating condition. For example, at this step, the quantity of fuel may be determined based on the accelerator pedal position and the mass air flow into the engine, both of which are measured and stored by the digital computer of the pump control unit 22. For example, the values may be read, scaled and saved during repeated executions of a background loop such as described in the U.S. Pat. No. 4,653,315 previously referred to.

At step 52, the program determines the count to be set into the counter 32 that would result in simulated crankshaft angle signals being generated by the counter 32 at intervals equal to the time for the crankshaft to be rotated through an angle equal to the spacing of the teeth on the ring gear 14. In general, the count required to be set into the timer to accomplish this function is a function of the engine speed, the computer clock frequency and the angular spacing between teeth on the ring gear 14 and must result in the counter 32 changing states at intervals equal to the time for the crankshaft 14 to rotate through one-half of the angular spacing between the ring gear teeth 14. It is apparent that the time for the crankshaft to rotate through one-half the angle between ring gear teeth can be determined from the engine speed calculated at step 48. From this, the number of clock pulses at the clock frequency that will occur over this time period can be determined.

In one embodiment, the count set into the counter 32 may be determined by a calculation at step 52 in accord with the expression:

$$count = Y*f/X$$

where Y is one-half of the angular spacing in degrees between teeth on the ring gear 14, f is the frequency of the clock pulses in pulses per second provided to the angle signal generator and X is engine speed in degrees per second.

In the preferred embodiment, the step 52 utilizes a lookup table to obtain the number of clock counts required to be set into the counter 32. In this regard, the digital computer of the pump control unit 22 stores a table of lookup values of clock counts that is a function of the engine speed calculated at step 48, with each value stored representing the time for the ring gear 14 to rotate through one-half of the angular spacing between ring gear teeth at the corresponding engine speed. Accordingly, step 52 looks up the number of clock counts that are stored corresponding to the average engine speed calculated at step 48. This number is then loaded into an output register in the digital computer of the pump control unit at step 54 so that upon the occurrence of the next engine top dead center position, the counter 32 is gated to load the determined count to generate the simulated crankshaft angle signals.

At step 56, the program determines whether or not a fault has occurred in the ring gear tooth sensor. A fault may occur, for example, as a result of a worn or missing tooth on the ring gear 16 or because of a fault in the circuit transmitting the signal to the angle signal generator 20. In the present embodiment, a sensor is determined to be failed if the number of ring gear flywheel teeth counted between consecutive top dead center positions of the engine 10 does not equal the required number. This is accomplished by sampling the count in an input counter of an input circuit of the computer in the pump control unit 22 that is clocked by the ring gear angle signals RG. If this count equals the specified value indicating that the ring gear angle signals are valid, the program proceeds to a step 58 where the counter counting the ring gear angle signals is reset to again begin counting the number of ring gear angle pulses RG generated between consecutive top dead center positions of the engine 10.

The program then sets the select signal provided at a data port output of the digital computer of the pump control unit 22 to a low state at step 60. This state is maintained at the data port output until changed in accord with the routine of FIG. 3. Referring to FIG. 2, when the state of the select signal provided at the data port output of the pump control unit 22 is low, the output of the inverter is high enabling the AND gate 24 to transmit the ring gear angle signals through the OR gate 28 to the pump control unit 22.

Returning to step 56, if it is determined that a failure has occurred in the ring gear teeth sensing circuit providing the ring gear angle signals RG, the program proceeds to a step 62 where the input counter of the digital computer of the pump control unit 22 counting the ring gear angle signals is reset to again begin counting the number of ring gear angle pulses RG generated between consecutive top dead center positions of the engine 10.

At the step 64, the select signal at the data port output of the digital computer in the pump control unit 22 is set to a high state thereby disabling the AND gate 24 and enabling the AND gate 26 which transmits the simulated crankshaft angle pulses to the pump control unit 22 via the OR gate 28. In this manner, upon a sensed failure in the ring gear tooth sensor, the simulated ring gear angle signals are substituted therefor so as to provide an uninterrupted crankshaft angle signal.

The foregoing description of a preferred embodiment for the purpose of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. For a multi-cylinder internal combustion engine having an output crankshaft rotated by the engine, a system for generating angle signals for engine control upon rotation of the crankshaft, the system comprising:

a crankshaft rotation sensor comprising (A) a ring gear rotated by the crankshaft, the ring gear having teeth spaced at predetermined angles around its periphery and (B) means for sensing the passing of the teeth on the ring gear as the crankshaft is rotated and providing a ring gear angle signal for each tooth sensed, each ring gear angle signal representing a rotation of the crankshaft equal to the predetermined angle;

means for determining the value of engine speed upon the occurrence of each cylinder top dead center position of the crankshaft;

a clock for generating clock pulses at a predetermined frequency;

means for determining, upon the occurrence of each cylinder top dead center position of the crankshaft, the number of clock pulses at the predetermined frequency that will occur over a time period required for the crankshaft of the engine to rotate over one-half of the predetermined angle at the measured engine speed;

a counter for repeatedly counting clock pulses applied thereto to a number preset therein, the counter having a bistable output shifting between first and second states each time the number of clock pulses counted equals the number preset therein; and means for presetting the determined number of clock pulses into the counter upon the occurrence of each cylinder top dead center position of the crankshaft, the output of the counter comprising simulated crankshaft angle signals, each simulated crankshaft angle signal representing a rotation of the crankshaft equal to the predetermined angle;

means for sensing a failure in the crankshaft rotation sensor; and means selecting the ring gear angle signal in the absence in a sensed failure in the crankshaft rotation sensor and selecting the simulated crankshaft angle signals during a sensed failure in the crankshaft rotation sensor, the selected ring gear angle comprising the angle signals for engine control.

* * * * *